United States Patent [19]

Poulos

[11] Patent Number: 4,843,368

[45] Date of Patent: Jun. 27, 1989

[54] ENHANCED DECELERATION CONDITION DISCLOSING DEVICE

[76] Inventor: Vincent M. Poulos, 675 Golden Rd., Fallbrook, Calif. 92028

[21] Appl. No.: 37,247

[22] Filed: Apr. 10, 1987

[51] Int. Cl.$^4$ .............................................. B60Q 1/44
[52] U.S. Cl. .................................. 340/464; 200/61.47
[58] Field of Search ...................... 340/72, 71, 66, 76, 340/669, 67; 200/61.47, 183, 185

[56] References Cited

U.S. PATENT DOCUMENTS

| | | | |
|---|---|---|---|
| 2,971,067 | 2/1961 | Ticknor | 340/72 R |
| 3,089,129 | 5/1963 | Nassikas et al. | 340/72 X |
| 3,559,164 | 1/1971 | Bancroft et al. | 340/72 |
| 3,596,244 | 7/1971 | Litke | 340/67 |
| 3,743,802 | 7/1973 | Avenick | 200/61.47 |
| 3,760,353 | 9/1973 | Hassinger | 340/72 |
| 3,846,749 | 11/1974 | Curry | 340/72 |
| 3,939,316 | 2/1976 | Stropkay | 340/72 X |
| 4,163,127 | 7/1979 | Herou | 200/61.47 |
| 4,384,269 | 5/1983 | Carlson | 340/67 |
| 4,403,210 | 9/1983 | Sullivan | 340/72 |

*Primary Examiner*—Joseph A. Orsino
*Assistant Examiner*—Brian R. Tumm
*Attorney, Agent, or Firm*—John J. Murphey

[57] ABSTRACT

A device for attachment in a vehicle brake light circuit for causing flashing of the brake lights when the vehicle undergoes an enhanced degree of deceleration comprising an accelerometer for determining when the enhanced degree of deceleration is reached, a first circuit component to determine whether the incoming power to the brake lights are for brake light operation or turn signal operation, a second circuit component to activate a pulse generating component, a timer component to stop the pulse generating component after a predetermined period of time and means to accumulate these various inputs and produce a time pulse flashing in the brake lights.

9 Claims, 9 Drawing Sheets

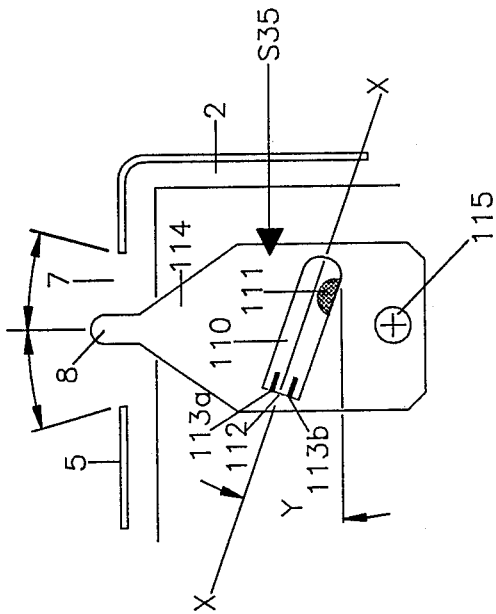
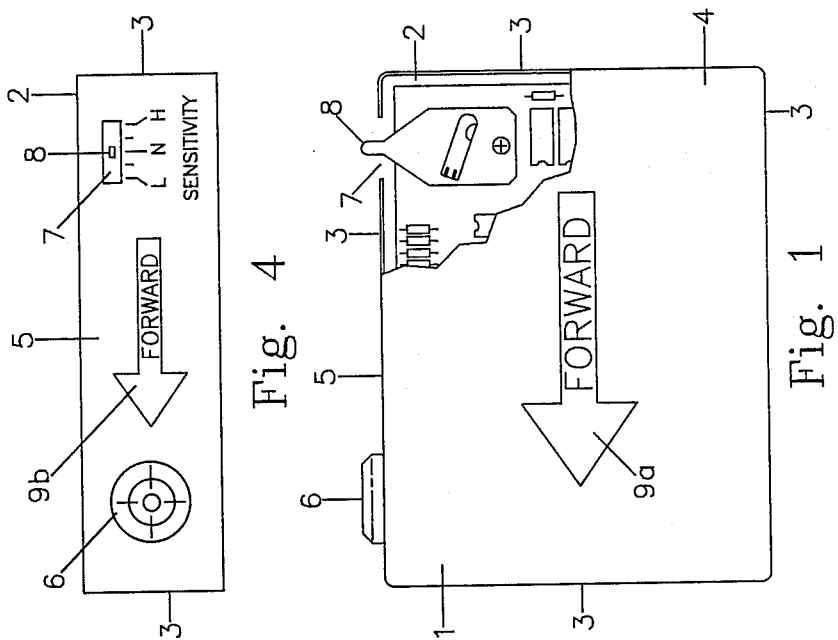

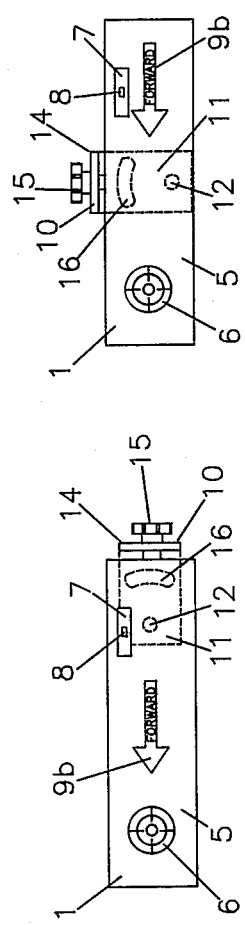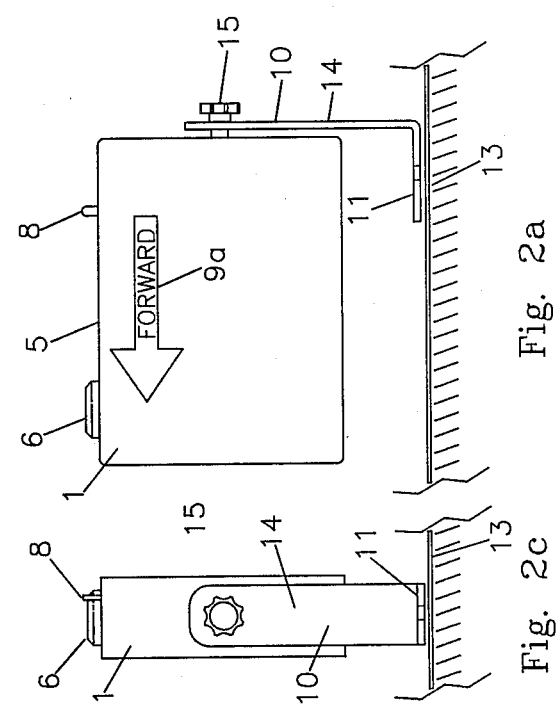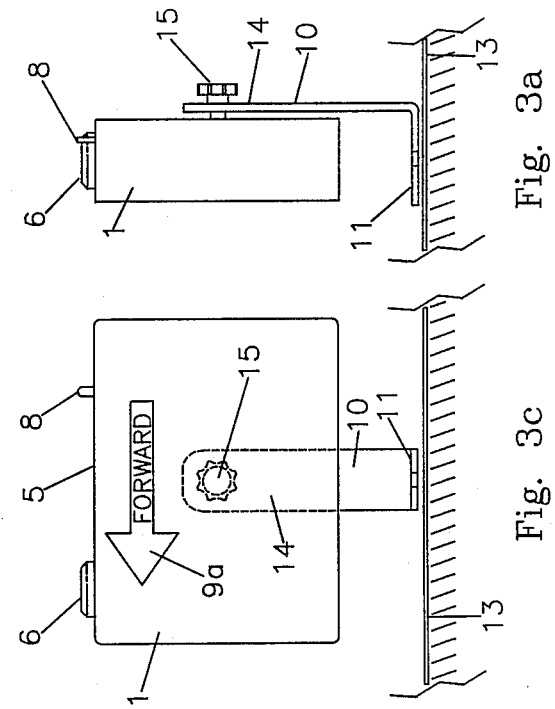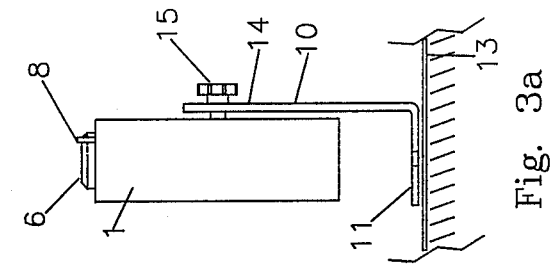

ENHANCED DECELERATION CONDITION DISCLOSING DEVICE

BACKGROUND OF THE INVENTION

1. Field of the Invention

This invention pertains to the field of energy-actuated devices used to disclose conditions of deceleration. More particularly, this invention pertains to vehicular brake light systems and to circuitry that enhances normal brake indications to disclose special conditions of severe deceleration through attention-getting phenomena such as pulsation or flashing in the brake lights.

2. Description of the Prior Art

Where numerous bodies under rectilinear motion are in close proximity, provisions are generally provided to indicate front-to-rear spatial decreases through sensory perceived indicators such as buzzers, horns and lights. While this includes a broad range of vehicles such as airplanes, ships and land vehicles, it is particularly important in high-speed mass transit land vehicles such as automobiles, trucks and buses. This invention is used in them to insure positive indication of atypical decreasing vehicular distance in order to avoid unexpected collisions.

On the roads, every vehicle, powered or unpowered, is required to have rearwardly directed visual indicators, such as brake lights, that illuminate when the vehicle is decelerating through brake means actuated by the vehicle operator. Thus, the illuminating brake lights of the vehicle in front indicate to the operator of the vehicle to the rear that the spatial relationship between the vehicles is beginning to decrease and unless the operator of the rear vehicle does not take adequate precautions, the distance may reduce to dangerous closeness.

Unfortunately, typical brake light illumination shows only a single condition of deceleration; it does not indicate the degree of deceleration. Accordingly, a vehicle with its brake lights glowing may either be slowing at a rate that provides adequate notice to the operator of the vehicle to the rear to begin applying brakes and generally retard the closure rate or deceleration at such a substantial rate that ordinary application of the brakes will be insufficient to prevent a rear end collision from occurring.

The prior art has sought to enhance vehicle brake light circuitry by providing means to cause the glowing brake lights to pulsate or flash when the decelerating condition of the vehicle exceeds a limit beyond which closure rates from following vehicles exceed dangerous proportions. Two reasons, however, appear as stumbling blocks to the acceptability and commercial success of these inventions. The first is that many of them need to be interfaced with the brake pedal, hydraulic lines, clutch, speedometer cable, transmission or automobile electrical circuitry in order to function and thus require significant installation costs and often complicate the activities of other electrical components and sometimes nullify certain warranties covering other vehicle components. Manufacturers of new cars have declined to install these devices in the assembly line and the complicated installation has inhibited the retrofit or after-market industry. The second stumbling block has been the difficulty of the prior art devices to conveniently be adapted to both the one-wire brake light circuitry, where a common wire feeds both the left and right brake lamps, as well as the two-wire brake light circuitry where independent brake voltage supply wires are provided for the left and right brake lamps. The two-wire system is generally associated with American-made vehicles whereas the one-wire system is generally associated with other makes of vehicles. For the most part, none of the prior art devices is usable with both types of circuitry without substantial modification and thus none is easily installed.

As an example, U.S. Pat. No. 3,528,056 requires physical connection to the hydraulic brake lines: U.S. Pat. No. 3,665,391 requires a separate set of signaling lamps be attached to the vehicle and is not usable with the one-wire system; U.S. Pat. No. 3,748,643 requires replacement of the vehicle tail lights and connection to the brake pedal and does not have means to adjust the degree of deceleration; U.S. Pat. No. 3,760,353 is not compatible with the two-wire brake light system. U.S. Pat. No. 4,357,594 is overly complex and requires direct tie-in to the brake pedal and speedometer cable; U.S. Pat. No. 4,384,269 requires special fitting to the brake pedal: U.S. Pat. No. 4,403,210 delivers a flashing pulse train to the brake lights irrespective of the degree of deceleration: U.S. Pat. No. 4,464,649 requires intricate interconnection with the vehicle's electric system and brake pedal; and, U.S. Pat. No. 4,550,305 requires a complex interconnection between the brake, clutch and other components.

What is therefore lacking is a device that is capable of both original installation in a new vehicle and retrofit to an older vehicle, that is capable of utilization with the one-wire and two-wire brake light circuitries, that is free of requirements for interconnection to numerous components of the vehicle, and that is adjustable to various degrees of deceleration.

SUMMARY OF THE INVENTION

This invention is a unique device incorporating a special circuit for providing enhancement to the brake lights by way of pulsed flashing when the vehicle has reached and exceeded a desired degree of deceleration all without the problems presently existing in the prior art. This invention is adaptable without modification to both the one-wire and two-wire brake light circuits. It requires no interconnection with any component other than the electric wire or wires going to the brake lights. In addition, this invention provides for the unique capability of having the brake light enhancement or flashing continue beyond the cessation of the predetermined decelerating condition when use of the brake is continued to decelerate the vehicle at a slower rate than would otherwise actuate the enhancement function. The device is adaptable to a wide variety of brake lamp wattage and is further adjustable to function over a wide variety of decelerating rates. Provisions are made to provide remote indicators, such as for instance a light or buzzer on the vehicle's dash board, to indicate the onset, duration and cessation of the enhancement system, and other provisions are optionally provided to insure that the invention cannot be misused to provide enhancement or flashing at all levels of deceleration so as to give false readings to other drivers.

While this invention finds particular application to motorized vehicles, it really has far broader use. It is usable in non-motorized vehicles such as trailers, for example boat trailers and house trailers, that are pulled by motorized vehicles and have their own brake lights. It also can be applied to non-surface moving vehicles such as airplanes and space craft where decelerating conditions are of paramount importance. It may even be used on ships.

With respect to motorized land vehicles such as motorcycles, cars, buses, trucks and trailers, this invention finds particular utilization when connected to brake lights to disclose a desired condition of deceleration, wherein the same lights are otherwise capable of operations for other than the particular decelerating condition such as general braking and turn signalling.

Accordingly, the main object of this invention is a device for enhancing the operation of an energy-actuated appliance, such as a set of brake lights, to indicate the achievement of a desired degree of vehicular deceleration; other objects include a device that is adaptable to one-wire and two-wire brake light circuits, that does not require connection to any vehicular component other than the brake light wire or wires (and chassis ground) and that can be easily and conveniently adjusted to virtually an infinite number of decelerating conditions. Still other objects include a device that continues the energy activation of the enhancement following cessation of the decelerating condition while the brakes are used to decelerate the vehicle at a rate less than that which would trigger the enhancement; a device that provides for remote indication of circuit function, a device for either original inclusion in a new vehicle or simple retrofitting in an existing vehicle, and a device that makes provisions to insure against its misuse to actuate in other than desired decelerating conditions. Finally, the device is small, sturdy and made of solid state components that tolerate extensive abuse and withstand a variety of climatic conditions typically found in the vehicle environments.

These and other objects will become more apparent upon reading the following description of the preferred embodiments taken in conjunction with the drawings attached hereto. The exclusive rights, guaranteed under Article 1, Section 8, of the United States Constitution, claimed by this inventor may be gleaned from a fair reading of the claims that conclude this patent.

DESCRIPTION OF THE DRAWINGS

FIG. 1 is a front plan view, partly in section, of one of the preferred embodiments of the device of this invention.

FIG. 2a, 2b and 2c are respectively a front plan view, a top plan view and a side plan view of one embodiment of the bracket mounting of the embodiment shown in FIG. 1.

FIGS. 3a, 3b and 3c are respectively a front plan view, a top plan view and a side plan view of another embodiment of the bracket mounting of the embodiment shown in FIG. 1.

FIG. 4 is a top plan view of the embodiment shown in FIG. 1;

DESCRIPTION OF THE PREFERRED EMBODIMENT

Figure 5:
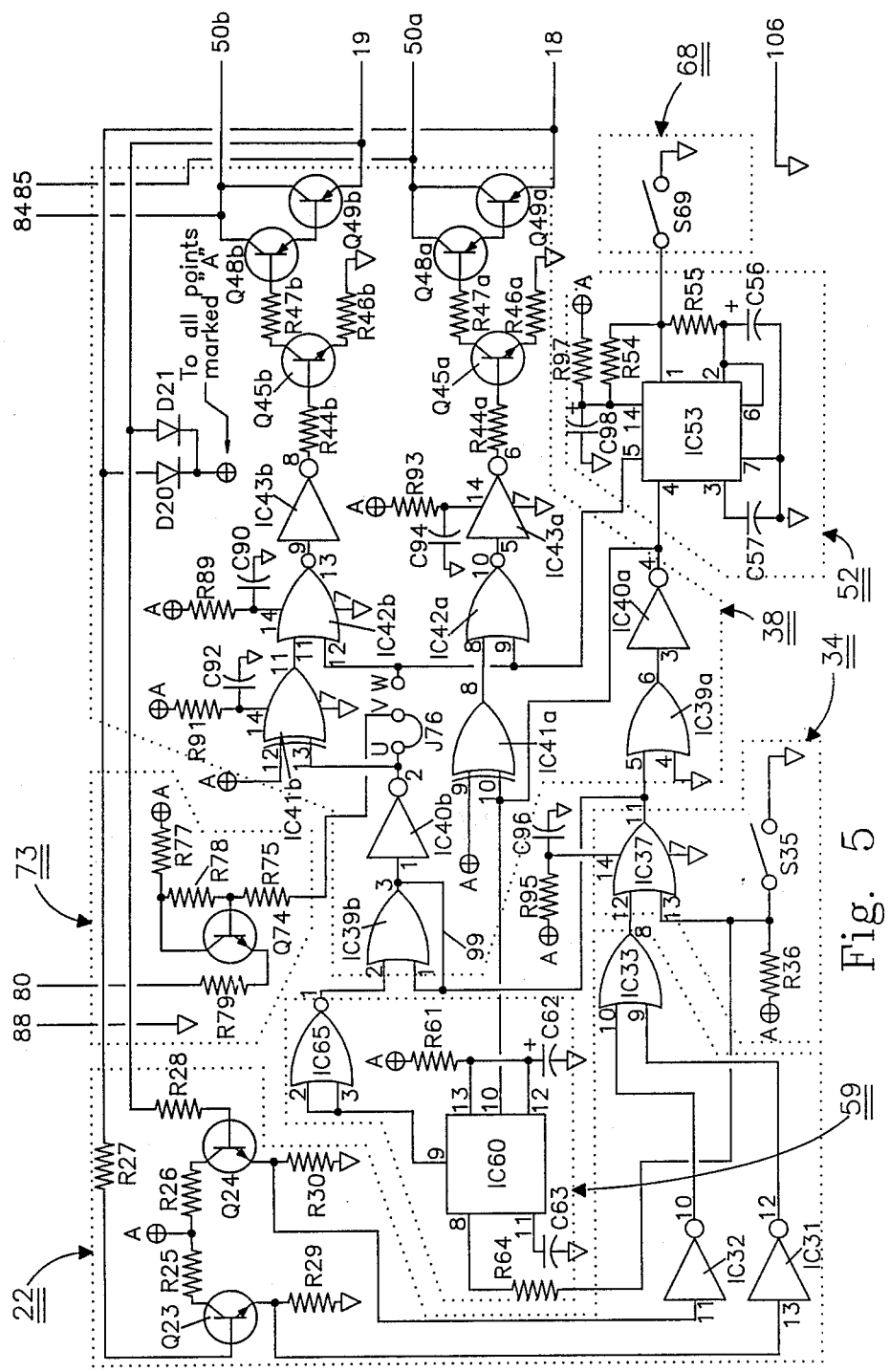
FIG. 5 is a full line component schematic diagram of the preferred embodiment of this invention.

In FIGS. 1 and 4 are shown one embodiment of the invention housed in a container 1 that is formed of a flat, rectangular base 2 enclosed by surrounding upstanding contiguous side walls 3 and a flat cover 4 to form an almost fully-enclosed envelope. Container 1 is adapted to be mounted to the vehicle upright as shown in FIG. 1 so that one of said side walls 3 serves as a top 5 on which is mounted a level indicating device 6, such as a circular spirit level as shown, as well as having a slot 7 formed therein through which a tab 8 extends for adjusting the degree of deceleration desired to initiate the enhancement function. This adjustment feature will hereinafter be more fully explained. A direction indicia is placed on the outside of container 1, such as arrows 9a and 9b, to indicate which end of container 1 is to point forward upon attachment to the vehicle to render the deceleration adjustment mechanism functional.

As shown in FIGS. 2a, 2b, 2c, 3a, 3b and 3c, container 1 is preferrably mounted to the vehicle by means of an articulated bracket 10 that comprises a vehicle-mountable portion 11, having formed therein a first aperture 12 through which a fastener such as a screw (not shown) may pass into an aperture bored in the vehicle body 13, and a container-mountable portion 14 on which an adjustable, articulated fitting 15 is mounted that is threaded or otherwise adapted to adjustably attach to one of the side walls 3 (FIGS. 2a, 2b and 2c) or to base 2 (FIGS. 3a, 3b and 3c). Vehicle-mountable portion 11 has an arcuate slot 16 formed therein for receipt therethrough of another fastener so that portion 11 may be pivoted to bring the plane of base 2 in container 1 into axial alignment with the longitudinal axis of the vehicle.

As my own lexicographer, I will now establish some terms to be used in the balance of this specification. When reference is made to "high" logic levels, such levels mean direct current (D.C.) voltages of from about 1.5 volts up to about 12 volts, the battery voltage used in the vehicle and preferably about 5 volts. When reference is made to "low" logic levels, such levels mean D.C. voltages below 1.5 volt and preferably about 0 volts or ground. This is common in the art.

Referring now to FIG. 5, the circuit of this invention is conveniently contained on a circuit board (not shown) on which are mounted a series of components, including integrated circuits, transistors, diodes, resistors and capacitors. The solid lines between components refer to conductors and will not be individually numbered except where necessary. Where conductors cross and the intersection is marked with a dot or period it is a junction between them; where one conductor crosses another and the intersection has no dot but shows a discontinuity in one conductor there is no junction. The small numbers next to the conductor as it attaches to a component is the pin number of the component. Transistors are marked with a number beginning with "Q"; resistors with a number beginning with "R"; capacitors with a number beginning with "C"; diodes with a number beginning with "D"; "J" for jumper wires; switches with a number beginning with "S"; and, inverters, gates and precision timers with numbers beginning with "IC". In addition, to indicate logic patterns, I use the letters "H" to indicate high logic, "L" to indicate low logic, "P" indicates a pulse train and "D" to indicate no developed logic or "don't care". This is common in the art. I have outlined each "means" with dotted lines for clarity.

As shown in FIG. 5, the circuit receives battery voltage from source wire 18 (for left brake light voltage and/or turn signal voltage on two-wire systems) and from source wire 19 (for right brake light voltage and/or turn signal voltage on two-wire systems). In a one-wire system, both source wires 18 and 19 would receive voltage simultaneously to operate the brake lights as the turn signals would have separate lamps. In the two-wire system, source wires 18 and 19 could receive voltage simultaneously for brake light operation or separately for turn signal operation. The voltages in source wire 18 and source wire 19 are initially tapped by diodes D20 and D21 to provide system voltage to various points in the circuit. The conductors of this tapped voltage system are not otherwise shown, to reduce the number of conductors in the schematic for clarity, but exit to the circuit components at points marked "A".

The voltage from source wires 18 and 19 is received in first means 22 that develops logic patterns indicating whether the incoming energy is directed to activate the brake lights or a turn-signal disclosure function in the brake circuit. First means 22 comprises a pair of signal transistors Q23 and Q24 whose collectors are energized through voltage from A through respective resistors R25 and R26. The incoming voltage from source wires 18 and 19 are received through resistors R27 and R28 which is then fed to the respective bases of transistors Q23 and Q24. This incoming voltage causes transistors Q23 and Q24 to conduct, thus transferring voltage from the collectors to the emitters that are connected to ground through resistors R29 and R30. Resistors R29 and R30 maintain low logic levels to their respective inverters IC31 and IC32 until transistors Q23 and Q24 conduct. When they conduct, the voltage at the emitters overcomes the effect of the low level caused by resistors R29 and R30 thus creating high logic levels to inverters IC31 and IC32. The transistor having no voltage at its base from its respective source wire does not conduct to pass any voltage and accordingly maintains a low logic level. These logic levels are passed to said inverters IC31 and IC32 where their logic levels are inverted to the inputs of a 2-input positive-or gate IC33. IC33 produces a logic pattern indicating whether one or both signal transistors Q23 and Q24 have received voltage from source wires 18 and 19.

A second means 34 is provided for determining the existence of the enhanced degree of deceleration and to develop a logic pattern from that determination and from the output of first means 22. Second means 34 comprises an inertia switch S35, having one side permanently grounded and the other side pulled to a high logic level from voltage source A through resistor R36, that inputs to a 2-input positive-or gate IC37. The other input to gate IC37 comes from the output of gate IC33. The logic pattern developed out of gate IC37 indicates whether or not the desired degree of vehicular deceleration has been attained.

A third means 38 is provided that contains separate drive paths for each of the left and right brake/signal lights to connect incoming voltage to the proper light in response to the logic patterns emanating from first means 22 and second means 34 and further to generate an additional signal when the logic pattern from second means 34 indicates that the enhanced degree of deceleration has been achieved. Third means 38 comprises separate 2-input positive-or gates IC39a and IC39b that output to separate inverters IC40a and IC40b that output to one input each of separate 2-input exclusive-or gates IC41a and IC41b that output to one input each of separate 2-input positive-nor gates IC42a and IC42b. The output of each of gates IC42a and IC42b input to separate inverters IC43a and IC43b and these input through separate resistors R44a and R44b to the bases of separate drive transistors Q45a and Q45b. The emitters of transistors Q45a and Q45b are grounded through resistors R46a and R46b and the collectors are respectively connected through resistors R47a and R47b to the bases of cascaded drive transistors Q48a and Q48b. The emitters of drive transistors Q48a and Q48b are connected to the bases of power transistors Q49a and Q49b and adapted as is known in the art to act as power switches to separately convey, when fired, voltage from source wire 18 and voltage from source wire 19 to the respective outgoing conductors 50a and 50b to the respective brake lights. The separate drive paths of third means 38 just described activate the appropriate power transistor to deliver incoming energy to the proper brake/signal light in response to the appropriate logic patterns from first means 22 and second means 34. In addition, when the logic pattern from second means 34 indicates that the desired degree of deceleration has been attained, a signal is generated from the output of inverter IC40a or from the output of inverter IC40b that may be used to indicate this achievement.

An optional fourth means 52 is included that is responsive to the logic pattern of first means 22, including full brake light activation, and further responsive to the logic pattern or second means 34, indicating the enhanced degree of vehicular deceleration has been achieved, to produce a timed sequence of energy pulses for input to third means 38 to produce a flashing in both brake lights when the vehicle is undergoing the enhanced degree of deceleration. Fourth means 52 comprises a precision timer IC53 configured to operate in an astable mode that, in response to a high logic output of inverter IC40a, generates a sequence of energy pulses over a set time period for input to both gates IC42a and IC42b to be thereafter carried through to the bases of transistors Q48a and Q48b to produce the flashing in the brake lights. The pulse rate is established by the values of resistors R54, R55, capacitors C56, C57 and also powered through voltage from A. The preferred pulse rate is 4.8 cycles per second as this rate, coupled with the persistence of the general incandescent lamp used in most brake lights, produces an attention-getting flash. Other pulse rates are contemplated in this invention.

An optional fifth means 59 is provided for establishing, in response to the logic pattern from second means 34 indicating the enhanced degree of deceleration once achieved has terminated, a predetermined time delay to unlatch third means 38 in a posture where the signal is sustained during subsequent braking of the vehicle following loss of said achievement. Fifth means 59 comprises a precision timer IC60 powered from A having a set time, established by resistor R61, capacitor C62 and C63 for a short duration such as six seconds, that receives an input logic pattern through resistor R64 from inertia switch S35 and outputs to both inputs of a 2-input positive-nor gate IC65 whose output is the second input for 2-input positive-or gate IC39b.

When inertia switch S35 is actuated, and the brake is actuated, the appropriate logic levels are created to cause timer IC53 in means 52 to pulsate causing the brake lights to flash. IC39b latches and IC53 continues to pulsate after switch S35 has opened. However, when inertia switch S35 initially actuated, it also created low logic level to the trigger input of IC60 in means 59 starting a time delay of variable duration, such as six seconds. After six seconds, timer IC60 transitions to a low logic level at its output and the two inputs of IC65. IC65 now also transitions to a high logic level at its output and to pin #2 of IC39b of means 38 causing IC39b to unlatch and end the pulse train from IC53 while maintaining the constant "on" condition to the brake lights. Important is the fact that the time delay from means 59 starts the instant inertia switch S35 is closed and lasts the six seconds or whatever time is set. It lasts six seconds even if switch S35 is closed for less than six seconds, the six second period or longer than six seconds. For example, if the vehicle is traveling on the freeway at a high rate of speed and is braked suddenly, inertia switch S35 may close for three seconds. Under these circumstances, the flashing will last six seconds, three seconds for the onset and duration of the inertia switch hold and three more seconds for the remainder of the time in the circuitry in means 59. If the inertia switch is closed for longer than six seconds the time delay in means 59 will expire and not start another time delay so that when the brakes are released the flashing will stop. If, for example, the inertia switch is closed for nine seconds, the flashing will continue for the whole nine seconds and means 59 will deactivate after the first six seconds. It should be noted that if the brake pedal is released at any time during or after the flashing process, supply voltage ceases to exist to the circuitry, thus the astable timing of means 52 and time delay of means 59 is stopped. The logic and timing patterns of the circuit are volatile to the interruption of power and are reset each time the brake is released. It is assumed that when the operator of the vehicle releases the brake pedal, the need for sudden deceleration ceases to exist.

A further optional sixth means 68 is provided for nullifying fourth means 52 should inertia switch S35 be misused to set the device in a constant state of apparent enhanced deceleration rate. This particular option is important to prevent persons from misusing the invention to make their brake lights flash every time they put on the brakes. This is not the desired use of the invention and sixth means 68 can go far to render such misuse unavailable. Sixth means 68 comprises a gravity operated single pole, single throw switch S69 positioned in container 1 and adapted to remain open during all reasonable positioning of inertia switch S35 and close and ground out the discharge pin of precision timer IC53 when inertia switch S35 is set in a position that is constantly closed.

An optional seventh means 73 is provided as a driver circuit to remote the signal produced when the enhanced degree of deceleration is achieved. As shown in FIG. 5, seventh means 73 comprises a transistor Q74 whose base receives a continuous signal from the output of inverter IC40b through a resistor R75. This is accomplished when jumper cable J76 is connected between position U to position V. In addition, jumper cable J76 may be configured to select a pulsating signal from the output of timer IC53 in means 52 when it is connected between position V and position W. Transistor Q74 receives voltage to its collector from source A through resistor R77. The collector also feeds a portion of its voltage to the input of its respective base through resistor R78. Feedback resistor R78 may be increased or decreased in value to increase or decrease the volume or brilliance of any remote indicators. The variation of resistor R78 will also permit the adjustment of drive voltage to any external audio-visual device.

Figure 6:
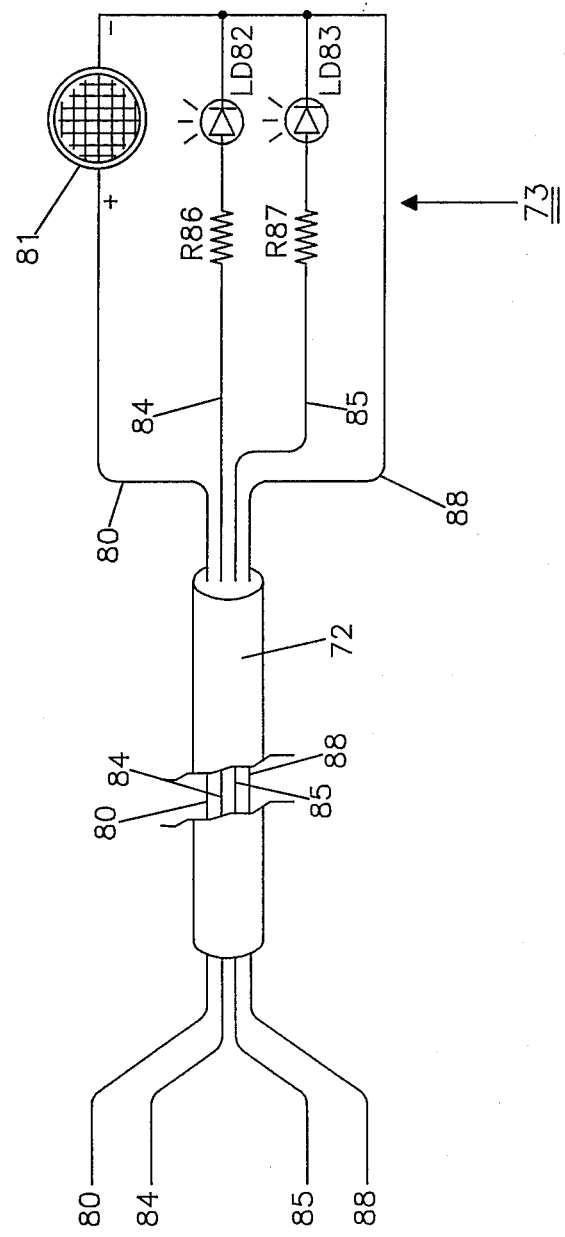
FIG. 6 is a diagram, partly in schematic, showing the option of a remote indicator to advise the operator when the enhancement is operative.

The emitter of transistor Q74 passes the signal through a resistor R79 and conductor 80 to the positive (+) input of a remote buzzer 81, shown in FIG. 6, the negative (−) input thereof connected through conductor 88 to ground.

Light emitting diodes LD82 and LD83 are shown in FIG. 6 as remote indicators that duplicate the electrical results at conductors 50a and 50b. The voltage that is conducted to the collectors of transistors Q48b and Q49b is carried by conductor 84 to the remote indicator as shown in FIG. 6. In a similar manner, the voltage that is conducted to the collectors of transistors Q48a and Q49a is carried by conductor 85 to the remote indicator. The voltages are received at the respective anodes of LD82 and LD83 through resistors R86 and R87; the respective cathodes are connected through conductor 88 to ground. Conductors 80, 84, 85 and 88 may conveniently be housed in a conduit 72.

Additionally, a resistor-capacitor (R-C) decoupling combination is connected to each integrated circuit to provide the necessary filtering from radio frequency (R.F.), ripple and noise. The resistor is connected in series between voltage source A and the plus (+) voltage pin of its respective integrated circuit while the capacitor is connected on one side to the integrated circuits plus (+) voltage supply pin and on the other side to ground. R-C combination R89 and C90 provides decoupling to gates IC42a, IC42b and IC65. R-C combination R91 and C92 provides decoupling to gates IC41a and IC41b. R-C combination R93 and C94 provides decoupling to inverters IC31, IC32, IC40a, IC40b, IC43a and IC43b. R-C combination R95 and C96 provides decoupling to gates IC33, IC37, IC39a and IC39b. R-C combination R97 and C98 provides decoupling to timers IC53 and IC60. Some of these are not shown as the integrated chips are stacked together and the ones shown function for all the ones listed.

Figure 7:
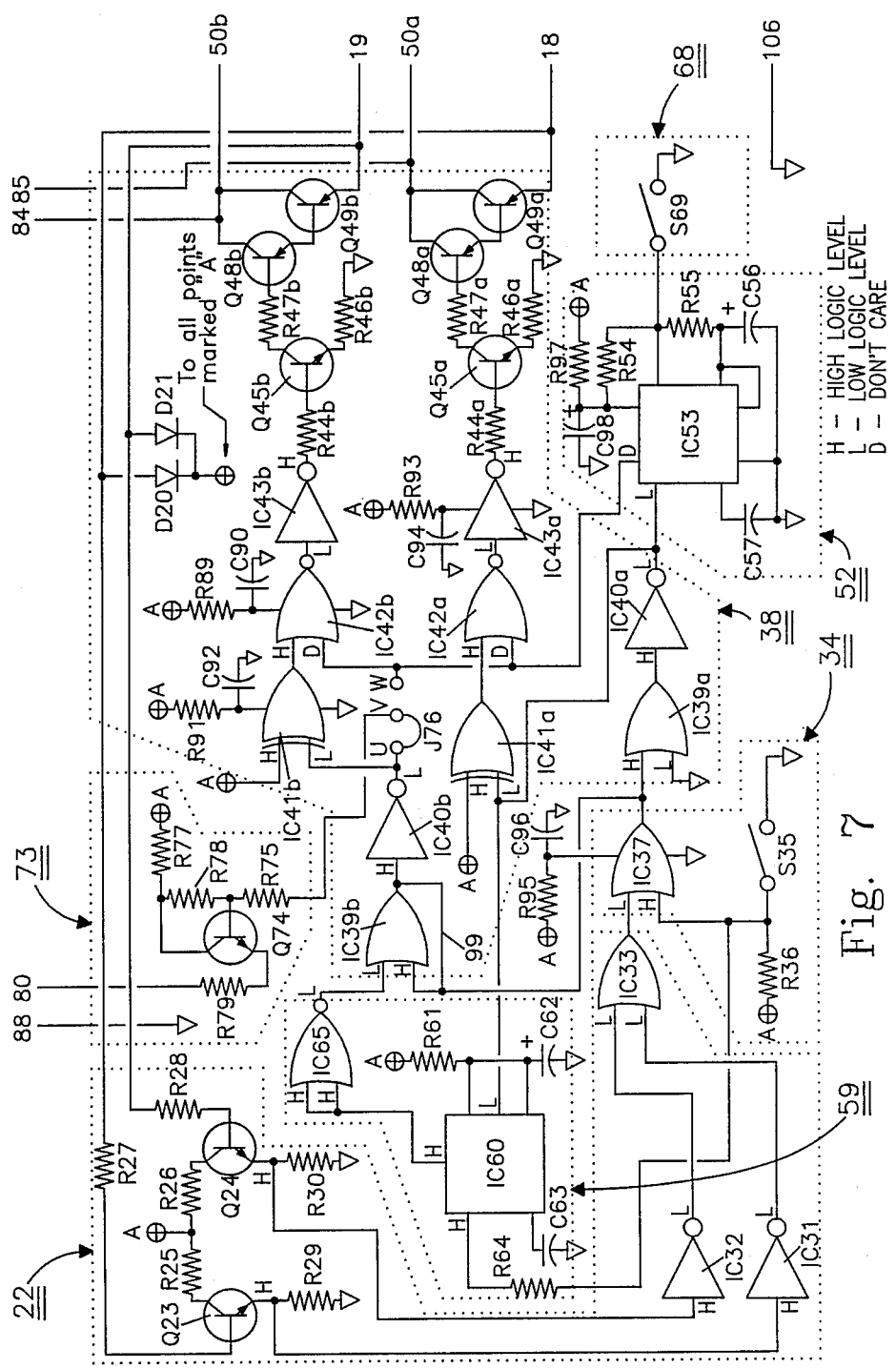
FIG. 7 is a schematic diagram of the circuit of the invention showing the logic levels under conditions where normal braking is occurring but where the desired degree of deceleration has not been achieved or exceeded.

Before describing the logic level function of my invention to produce an additional signal when the preset degree of enhanced deceleration is achieved, I will describe its operation in the passive mode that maintains the integrity of the vehicular brake system during ordinary braking and when, in the two-wire system, the brake lights are also used as turn signals. Referring now to FIG. 7, when ordinary braking occurs, both source wires 18 and 19 receive voltage from actuation of the brake pedal. The voltage powers up the circuit through diodes D20 and D21 and conductors (not shown) to provide voltage at all points labeled "A". The two source voltages enter first means 22 through resistors R27 and R28 to excite signal transistors Q23 and Q24 to produce high logic level outputs that input inverters IC31 and IC32 to be inverted and input to gate IC33 as low logic levels to produce a low logic level output. This is the logic pattern indicating the incoming voltage to the circuit is meant to drive both brake lights.

Under this normal braking, inertia switch S35 in second means 34 remains open so that it inputs gate IC37 at a permanently high logic through voltage from A. This input logic pattern plus the logic pattern output from first means 22 generates a high logic output from gate IC37 that inputs to third means 38. This high logic is simultaneously input to separate gates IC39a and IC39b whose other input is permanently grounded low (IC39a) and maintained low at pin 2 in IC39b from gate IC65. These different logic inputs produce high logic outputs that are inverted by invertors IC40a and IC40b to low logic outputs. These low logic outputs are input to gates IC41a and IC41b whose second inputs are held permanently high through separate source A. Gates IC41a and IC41b develop high logic outputsto gates IC42a and IC42b. The low logic output of IC40a may not go further than as input to gate IC41a. However, as shown, optional fourth means 52 is employed and the low logic output of gate IC40a inputs to precision timer IC53. This low level maintains a non-operative state to precision timer IC53 so that the output therefrom that is shown imputing to gates IC42a and IC42b are rendered with no logic or in a "don't care" posture. The posture of these inputs along with the separate high logic inputs from gates IC41a and IC41b cause gates IC42a and IC42b to produce steady low logic outputs that are inverted by inverters IC43a and IC43b to high logic levels to drive driver transistors Q45a and Q45b that in turn drive driver transistors Q47a and Q47b that in turn drive power transistors Q49a and Q49b and connect the incoming voltage from source wires 18 and 19 through the respective exit conductors 50a and 50b to the appropriate brake lights. The failure of switch S35 to be closed during normal braking creates a logic pattern in second means 34 that fails to produce the additional signal (high logic) output from invertors IC40a and IC40b. This lack of additional signal prevents timer IC53 from developing the pulse train so that the brake lights are powered to a steady voltage and illumination.

Figure 8:
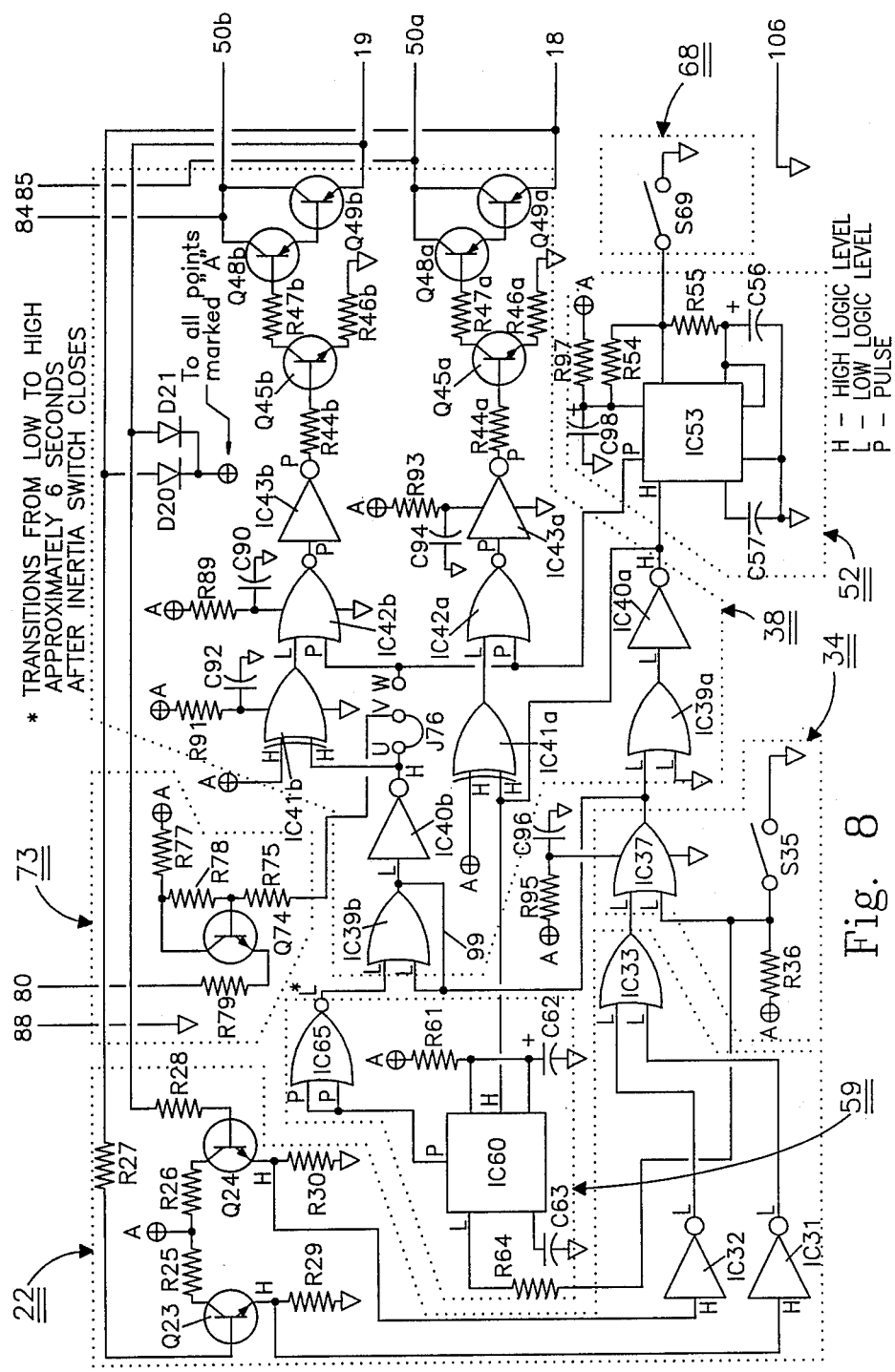
FIG. 8 is a schematic diagram of the circuit of the invention showing the logic levels under conditions where the desired degree of deceleration has been reached or exceeded.

The circuit logic patterns developed during the enhanced degree of deceleration is shown in FIG. 8 and is as follows: When the brakes are applied, voltage is received at both source wires 18 and 19 so that the circuit is powered at all points A through diodes D20 and D21. Source voltage through resistors R27 and R28 is conducted to high logic in signal transistor Q23 and Q24 that is passed through to the respective inputs of inverters IC31 and IC32 where they are converted to low logic. These low logic inputs to gate IC33 exit gate IC33 and first means 22 as a low logic pattern which indicates that the incoming source voltage at source wires 18 and 19 are to power both brake lights. This low logic pattern is input to gate IC37 of second means 34. Inertia switch S35 is now closed by virtue of the vehicle achieving the enhanced degree of deceleration so that the second input to gate IC37 is pulled low from its normally high logic. Thus, both inputs to gate IC37 are low logic which causes a low logic pattern output from gate IC37 and second means 34 to input both separate paths of third means 38 for driving the brake lamps. The second input to gate 39A is constantly held low at ground. The second input (at pin 2) of gate IC39b is held low from gate IC65 of fifth means 59. These twin low inputs to the separate gates IC39a and IC39b create a low input to inverters IC40a and IC40b to be inverted and become one high logic input each to gates IC41a and IC41b. The other inputs of IC41a and IC41b are held at constant high through A causing the respective outputs of these gates to show low and are inputed to gates IC42a and IC42b.

At this point, one may tap the high logic output of inverter IC40a and IC40b, as previously described, to actuate seventh means 73 and produce a remote signal in a separate set of indicators. Also, one could use the high logic output from either source to actuate fourth means 52 to actuate a pulsating flash in the brake lights.

The use of fourth means 52 will now be described in this mode. As shown in FIG. 8, the high logic emanating from inverter IC40a inputs the reset pin of precision timer IC53 to generate a sequence of energy pulses that input respectively to gates IC42a and IC42b. This pulse is seen by gates IC42a, IC42b, inverters IC43a, IC43b and transistors Q45a, Q45b, Q48a and Q48b as alternating high and low logic levels so that power transistors Q49a and Q49b pass current from source wires 18 and 19 to their respective brake light lines 50a and 50b in the same series of high and low logic pulses, to create the flashing in the brake lights.

As soon as the enhanced degree of deceleration ceases, inertia switch S35 opens to allow the input to gate IC37 to be pulled high by A. If the brakes are still being applied then source wires 18 and 19 are still receiving voltage to power the circuit. If there is no further braking, no current is received from source wires 18 and 19 and the whole circuit becomes deactivated.

While, however, the brakes are used to decelerate the vehicle following achievement of the enhanced degree of deceleration, inertia switch S35 closes and the low logic level therefrom triggers fifth means 59 and specifically precision timer IC60. IC60 thereafter outputs a time delayed signal to both inputs of gate IC65 for a set period of time such as six seconds and thereafter the output of gate IC65 transitions from low to high logic. This transition renders the inputs to gates IC39a and IC39b as one low and one high logic. The output of gate IC39b is tapped back into one input by a conductor 99. The result of the logic conditions from gate IC65 and subsequent logic gates now returns the circuit to the constant "on" condition for normal braking and unlatches gate IC39b.

Figure 9:
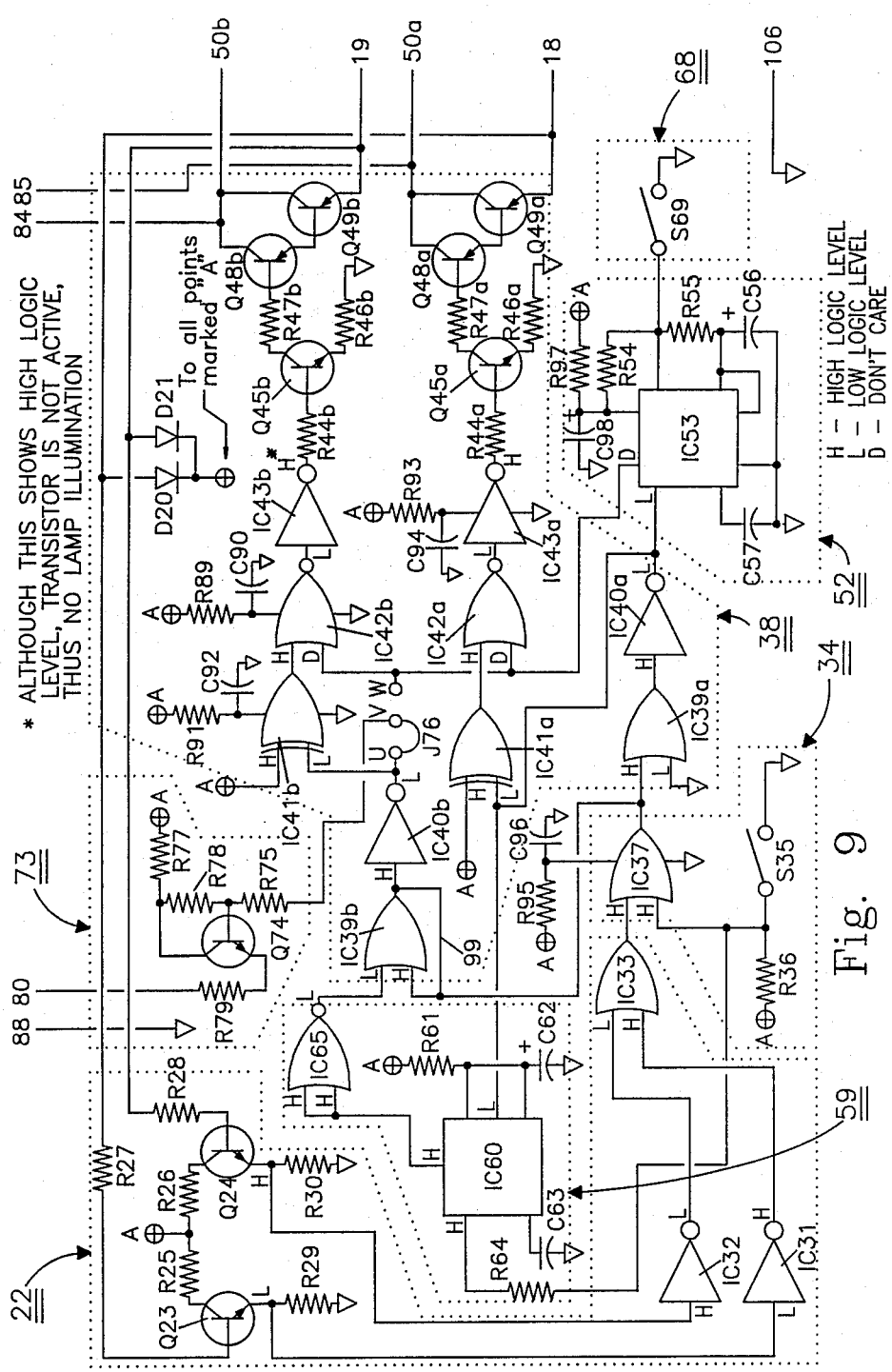
FIG. 9 is a schematic diagram of the circuit of the invention showing the logic levels under conditions where the brake lights are used as turn signals.

FIG. 9 shows the circuit when the brake light system is used, in the two-wire configuration, as turn signals. Only one of source wires 18 or 19 will receive voltage, this time from the turn signal flasher as opposed to the brake pedal switch. The circuit is powered through either diode D20 or D21 depending upon whichever source wire receives the voltage. The single source of voltage drives only one of signal transistors Q23 and Q24 to provide a high logic level to the downstream inverter IC31 or lC32 while the other inverter sees only low logic. The combination of one high logic and one low logic input to gate IC33 results in a high logic output pattern from first means 22 that inputs to second means 34 at gate IC37. The high logic from open switch S35 inputs to gate IC37 to produce a high logic output from second means 34. This output inputs to third means 38 at both gates IC39a and IC39b and results in the same logic pattern to be developed as in the case of ordinary braking as previously described. Although all logic circuitry is actuated, only the two driver transistors and the power transistor connected to the source wire receiving voltage will pass that voltage to the brake light. Thus, only that light will illuminate to indicate the turn. If the turn signal flasher is activated before, during or after switch S35 closes from the effects of deceleration, the circuit will still pulsate providing the closure time of switch S35 is equal to or exceeds the "off" state of the turn signal flasher.

As the turn signal flasher slowly pulses voltage to the source, the circuit will "pulse" and transmit the voltage to the turn-indicating light. The slow pulse from the turn signal flasher overcomes the persistence in the incandescent brake lamp so that the light literally goes on and off as opposed to flashing when powered by a much faster pulse rate produced by timer IC53 in fourth means 52.

A unique feature of this invention is its use in both a one-wire and a two-wire brake circuit without substantial modification. The one-wire brake circuit is composed of only one voltage source wire to the two brake lights and the lights are separately grounded. The two-wire brake/turn signal circuit is comprised of a separate voltage source wire for the brake/turn signal filament to each lamp with the lamps being separately grounded.

Figure 11:
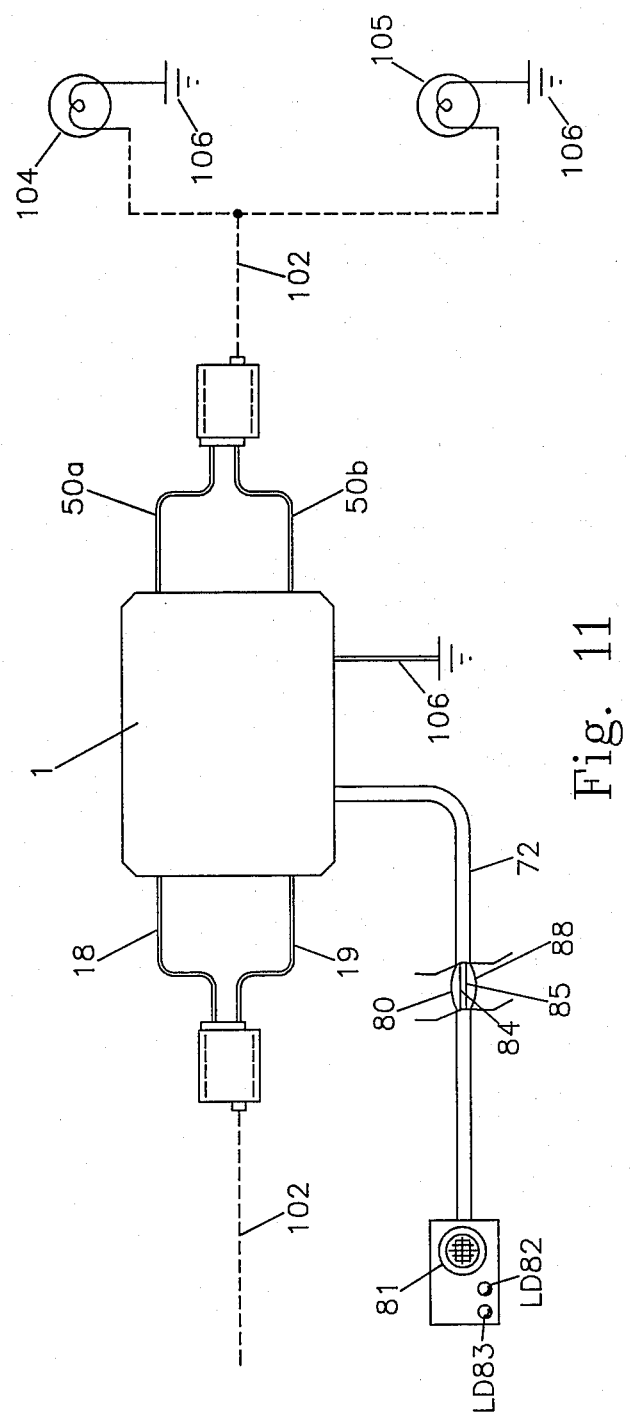
FIG. 11 is a diagram, partly in schematic, showing how the invention is connected to the 1-wire brake light system; and, FIG. 12 is a diagram, partly in schematic, showing one of the embodiments of the deceleration switch useful in the invention

The circuit of this invention is positioned in the one-wire system as shown in FIG. 11 by interrupting (cutting) the single voltage source wire 102, to the brake light filaments and connecting the incoming section to joined (both) source wires 18 and 19, and connecting the other end of source wire 102 to either joined or either one of the conductors 50a or 50b. Either 50a or 50b will power brake lights 104 and 105; joining them together to the outgoing section will increase the circuit's capacity to drive larger wattage brake lamps. All grounds of the circuit are tied to a common point and exit the circuit through conductor 106. Conductor 106 may connect to any suitable point in the vehicle chassis providing the point of the chassis returns to the negative contact of the power source.

Figure 10:
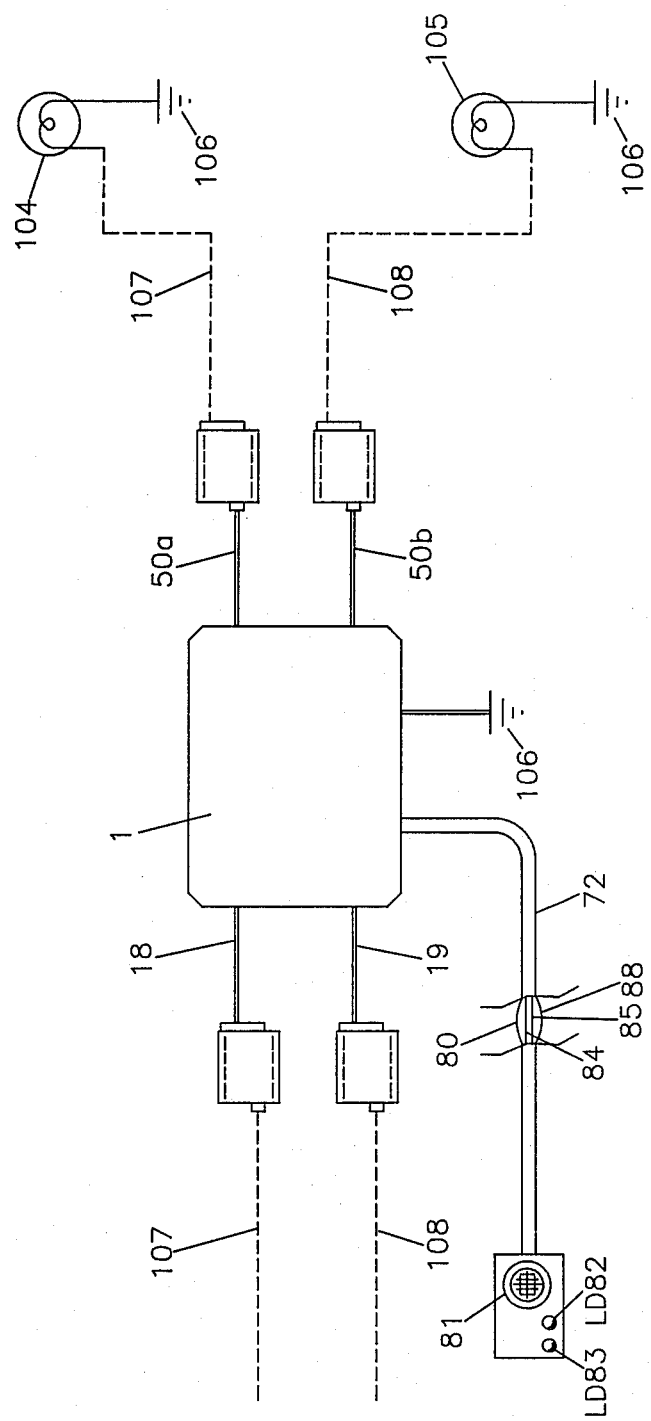
FIG. 10 is a diagram, partly in schematic, showing how the invention is connected to the 2-wire brake light system.

The circuit is positioned in the two-wire system as shown in FIG. 10 by interrupting (cutting) the separate voltage sources wires 107 and 108 to the brake/turn signal filaments, connecting the left wire 107 to left source wire 18 and the right wire 108 to right source wire 19 and then connecting the left outgoing wire 107 to exit conductor 50a and the other outgoing wire to exit conductor 50b taking care not to cross connect the wires.

Referring to FIG. 12, inertia switch S35 is shown to comprise a small, closed ended, non-conductive tube 110 containing a drop of mercury 111 wherein the opposite end of tube 110 is closed by a plug 112 containing spaced-apart conductor pins 113a and 113b. Pins 113a and 113b form the two nodes or sides of single-pole, single-throw switch S35. Tube 110 is mounted on a vertical plate 114 in such a manner that its elongated axis X—X strikes an acute angle Y with the horizontal plane of the vehicle with plug 112 facing toward the direction of vehicle travel. Plate 114 is held in frictional pivotal relationship on base 2 by a pin 115 passing through a matched pair of apertures (not shown) respectively in plate 114 and base 2. Tab 8 extends upward from plate 114 and out slot 7 in container top 5 thereby permitting plate 114 to be pivoted fore and aft along the vehicle's longitudinal axis to change angle Y to increase or decrease the degree of deceleration experienced by the vehicle before mercury drop 111 travels up tube 110 and shorts nodes 113a and 113b to close switch S35. While this represents one particular type of inertia or accelerometer switch, there are many that would operate as successfully and they are fully contemplated within the scope and spirit of this invention.

The logic patterns produced by the various means hereinbefore described can also be produced with different combinations of components. They can be produced in digital as well as in analog, microelectronic and hybrid form. All of these combinations are considered to be within the scope and spirit of this invention.

Following is a list of the components shown in the figures with references to their commercial source:

| Reference No. | Description | Source |
|---|---|---|
| 6 | Circular level | Exact Level |
| D20 & D21 | IN4002 Silicon diodes | |
| Q23 & Q24 | 2N3904, NPN transistors | Motorola |
| R25 | 1K, 5% carbon film resistor | |
| R26 | 1K, 5% carbon film resistor | |
| R27 | 330K 5% carbon film resistor | |
| R28 | 330K 5% carbon film resistor | |
| S35 & S69 | Mercury Switch | G.C. Products |
| R36a & R36b | 7.5K, 5% carbon film resistor | |
| Q44a & Q44b | 2N3904, NPN transistors | Motorola |
| R46a & R46b | 100, 5% carbon film resistor | |
| R47a & R47b | 100 5% carbon film resistor | |
| Q48a & Q48b | 2N3906, PNP transistors | Motorola |
| Q49a & Q49b | MJE2955, PNP transistors | SGS |
| R61 | 100K, 5% carbon film resistor | |
| C62 | 47 mfd, 25 volt, lytic capacitor | |
| R64 | 3.6K, 5% carbon film resistor | |
| R97 | 10, 5% carbon film resistor | |
| C98 | 22 mfd, 25 volt, lytic capacitor | |
| R54 | 200K, 5% carbon film resistor | |
| R55 | 260K, 5% carbon film resistor | |
| C56 | .47 mfd, 25 volt, lytic capacitor | |
| R29 | 680, 5% carbon film resistor | |
| R30 | 680, 5% carbon film resistor | |
| R89 | 680, 5% carbon film resistor | |
| R91 | 680, 5% carbon film resistor | |
| R95 | 4.7K, 5% carbon film resistor | |
| R93 | 680, 5% carbon film resistor | |
| R86 | 1.5K, 5% carbon film resistor | |
| R87 | 1.5K, 5% carbon film resistor | |
| LD82 | Light Emitting Diode, Red | IEE |
| LD83 | Light Emitting Diode, Red | IEE |

| Reference No. | Description | Source |
|---|---|---|
| 81 | Piezo Buzzer | Murata |
| C63 & C57 | .01 mfd, 100 volt, mylar capacitor | |
| C90, C92, C94, C96 | .1 mfd, 100 volt mylar capacitor | |
| IC53, IC60 | TLC556N, dual precision timer | Texas Inst. |
| IC31, IC32, IC40a, IC40b, IC431, IC43b | SN74LS04N, Hex inverter | Motorola |
| IC41a, IC41b | SN74LS86N, Quad 2-input Exclusive Or gate | Motorola |
| IC33, IC37, IC39a, IC39b | SN74LS32N, Quad 2-input Positive Or gate | Motorola |
| IC42a, IC42b, IC65 | SN74LS02N, Quad 2-input Positive Nor gate | Motorola |

What is claimed is:

1. A device for imposition solely in a vehicular brake light electric circuit, whether of the single-wire type or of the double-wire type, to generate a signal disclosing the achievement of an enhanced degree of vehicular deceleration for display in the brake lights, comprising:

(a) a first means for receiving incoming energy applied through the brake light electric circuit for continuously developing an output logic pattern in response thereto that distinguishes between one of the brake lights being used as a turn signal and both lights simultaneously being used as brake lights;

(b) a second means for continuously receiving the output logic patterns from said first means and including an automatically re-settable inertia-actuated switch that is activated when the vehicle has undergone an enhanced degree of deceleration, said second means producing one continuous logic pattern when said switch is not activated and a different logic pattern when said switch is activated;

(c) a third means for receiving the output of the logic patterns produced and developed in said second means, and in response thereto, causing the appropriate incoming energy to be connected to the respective brake light for displaying the appropriate use as a turn signal or as a brake light; and, (d) a fourth means interconnected said second means and said third means and activated by the logic pattern developed in said second means when said inertia switch closes for generating a separate warning signal, in the form of a sequence of energy pulses, to input to said third means at a pulse rate that, coupled with the persistence of the incandescent brake light generally used in the vehicular brake light electric circuit, produces an attention-getting flashing, for passage through said third means to the respective brake lights to warn those following the vehicle that the vehicle is undergoing an enhanced degree of deceleration.

2. The device of claim 1 where said pulse rate is 4.8 cycles per second.

3. The device of claim 1 further including timer means for producing a time-delay signal for latching said separate warning signal into said third means to continue production of said warning signal to the brake lights for a timed duration notwithstanding cessation of said enhanced degree of deceleration while the brake lights are displaying either a braking action or a turn signal action.

4. The device of claim 1 further including remote indicator means, actuated by said third means, for indicating, at a location other than at the brake lights, the achievement of the enhanced degree of deceleration that is signalled by the brake lights.

5. The device of claim 1 including further means for nullifying said separate warning signal when said device has been tampered with to attempt to indicate a constant achievement of enhanced deceleration.

6. The device of claim 1 wherein said inertia-actuated switch includes a mercury switch set at an inclined angle to the horizontal plane of the vehicle and adapted to close when sufficient deceleration is experienced in the braking of the vehicle.

7. The device of claim 6 wherein said mercury switch is adjustable as to inclined angle to the horizontal plane of the vehicle to close at different rates of deceleration of the vehicle.

8. The device of claim 1 wherein said inertia-actuated switch is an accelerometer.

9. A device for imposition solely in a vehicular brake light electric circuit, whether of the single-wire type or of the double-wire type to generate a signal disclosing the achievement of an enhanced degree of vehicular deceleration for display in the brake lights, comprising:

(a) a first means including a pair of signal transistors whose collectors are energized through incoming energy applied through the brake light electric circuit for developing an output logic in response thereto that distinguishes between one of the brake lights being used as a turn signal and both lights simultaneously being used as brake lights;

(b) a second means for receiving the output logic patterns from said first means and including a mercury switch set at an inclined angle to the horizontal plane of the vehicle and adapted to close when sufficient deceleration is experienced in the braking of the vehicle, said second means producing one logic pattern when said switch is not activated and a different logic pattern when said switch is activated;

(c) a third means for receiving the output of the logic patterns produced and developed in said second means, and in response thereto, causing the appropriate incoming energy to be connected through cascaded drive transistors to the respective brake light for displaying the appropriate use as a turn signal or as a brake light;

(d) a fourth means interconnected said second means and said third means and activated by the logic pattern developed in said second means when said mercury switch closes for generating a separate warning signal for passage through said third means to the respective brake light to warn those following the vehicle that an enhanced degree of deceleration has been achieved;

(e) wherein said fourth means produces a sequence of energy pulses to input to said third means at a pulse rate that, coupled with the persistence of the incandescent brake light generally used in the vehicular brake light electric circuit, produces an attention-getting flash;

(f) a fifth timer means for producing a time-delay signal for latching said separate warning signal into said third means to continue production of said warning signal to the brake lights for a timed duration of notwithstanding cessation of said enhanced degree of deceleration while the brake lights are displaying either a braking action or a turn signal action;

(g) a sixth remote indicator means, actuated by said third means, for indicating, at a location other than the brake lights, of the achievement of the enhanced degree of deceleration that is signalled by the brake lights; and, (h) a seventh means for nullifying said separate warning signal once said device has been tampered with to attempt to indicate a constant achievement of enhanced deceleration.

* * * * *